(No Model.) 9 Sheets—Sheet 1.

C. H. SOUTHALL.
MACHINE FOR BURNISHING AND FINISHING EDGES OF HEELS OF BOOTS.

No. 533,968. Patented Feb. 12, 1895.

*Fig. 1.*

Witnesses:—
Adam C Hart
Jno. W. Perkin

Inventor:—
Charles Henry Southall
by W. Fairburn Hart
Attorney (No Model.) 9 Sheets—Sheet 3.

C. H. SOUTHALL.
MACHINE FOR BURNISHING AND FINISHING EDGES OF HEELS OF BOOTS.

No. 533,968. Patented Feb. 12, 1895.

Fig. 3.

Witnesses:—
Adam C. Hart
Jno. W. Perkin

Inventor:—
Charles Henry Southall
By W. Fairburn Hart
Attorney

(No Model.) 9 Sheets—Sheet 5.
C. H. SOUTHALL.
MACHINE FOR BURNISHING AND FINISHING EDGES OF HEELS OF BOOTS.

No. 533,968. Patented Feb. 12, 1895.

(No Model.) 9 Sheets—Sheet 7.

C. H. SOUTHALL.
MACHINE FOR BURNISHING AND FINISHING EDGES OF HEELS OF BOOTS.

No. 533,968. Patented Feb. 12, 1895.

Witnesses:—
Adam C. Hart
Jno. W. Perkins

Inventor:—
Charles Henry Southall
By
Fairburn Hart
Attorney

(No Model.) 9 Sheets—Sheet 8.
C. H. SOUTHALL.
MACHINE FOR BURNISHING AND FINISHING EDGES OF HEELS OF BOOTS.
No. 533,968. Patented Feb. 12, 1895.

Witnesses:
Adam C. Hart
Jno. W. Perkins

Inventor:—
Charles Henry Southall
By W. Fairburn
Attorney (No Model.) 9 Sheets—Sheet 9.

C. H. SOUTHALL.
MACHINE FOR BURNISHING AND FINISHING EDGES OF HEELS OF BOOTS.

No. 533,968. Patented Feb. 12, 1895.

Witnesses:—
Adam C. Hart
Jno. W. Perkin

Inventor:—
Charles Henry Southall
by W. Fairburn Hart
Attorney

UNITED STATES PATENT OFFICE.

CHARLES H. SOUTHALL, OF LEEDS, ENGLAND.

MACHINE FOR BURNISHING AND FINISHING EDGES OF HEELS OF BOOTS.

SPECIFICATION forming part of Letters Patent No. 533,968, dated February 12, 1895.

Application filed September 30, 1893. Serial No. 486,898. (No model.) Patented in England November 10, 1890, No. 18,058, and March 8, 1893, No. 5,078, and in Canada March 27, 1894, No. 45,644.

*To all whom it may concern:*

Be it known that I, CHARLES HENRY SOUTHALL, a subject of the Queen of Great Britain, residing at Headingly, Leeds, in the county of York, England, have invented new and useful Improvements in Machines for Burnishing and Finishing the Edges of the Heels, Waists, and Soles of Boots and Shoes, (for which I have obtained Letters Patent in Great Britain, dated November 10, 1890, No. 18,058, and March 8, 1893, No. 5,078, and in Canada, dated March 27, 1894, No. 45,644,) of which the following is a specification.

This invention relates to improvements in machinery or apparatus for burnishing and finishing the edges of the heels, waists, and soles of boots and shoes; and the objects of these improvements are, first, to provide means for firmly holding the boot or shoe in such position that a number of burnishing or setting irons or tools, hereinafter termed tools, may be drawn to the edges by springs, and the machine started by the same operating lever, and the said tools moved backward and forward till the finishing or burnishing process is completed; second, to facilitate the holding and adaptation of the burnishing tools to their work; and third, to securely hold the starting lever in or out of work. I attain these objects by the mechanism illustrated in the accompanying drawings, in which—

Figs. 32, 33, and 34 are respectively side and end elevations, and a plan of connecting rod and lever arrangement for transmitting motion to the waist tool.

Similar letters refer to similar parts throughout the several views and when the detail views are hereinafter referred to their respective figures are inclosed in parentheses immediately following the reference letter.

Figures 7, 8:
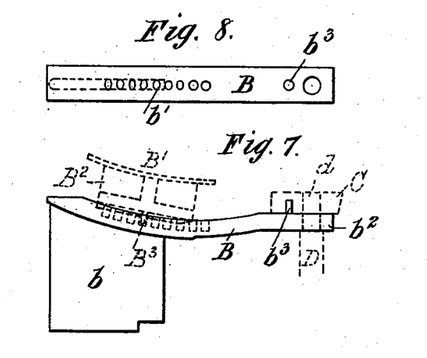
Figs. 7 and 8 are respectively an elevation and a plan of the stand for receiving the sole rest or stand and heel block.
Figure 9:
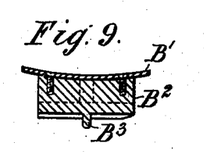
Figs. 9, 10, and 11 are respectively a longitudinal section, a transverse section, and a plan looking at the top of movable sole supporting piece.
Figure 10:
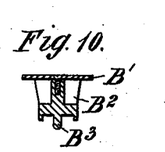
Figure 11:
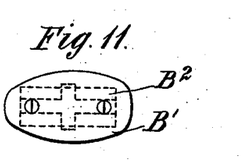
Figures 12, 13, 16:
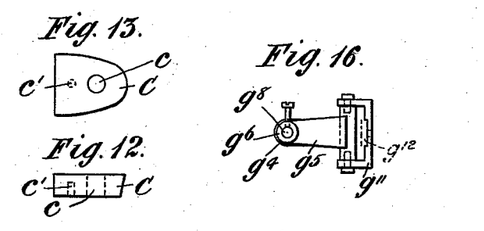
Figs. 12 and 13 are an elevation and a plan of heel block.
Figs. 14, 15, and 16 are a side elevation, an end elevation, and a plan of carrier for one of the forepart burnishing tools.
Figure 41:
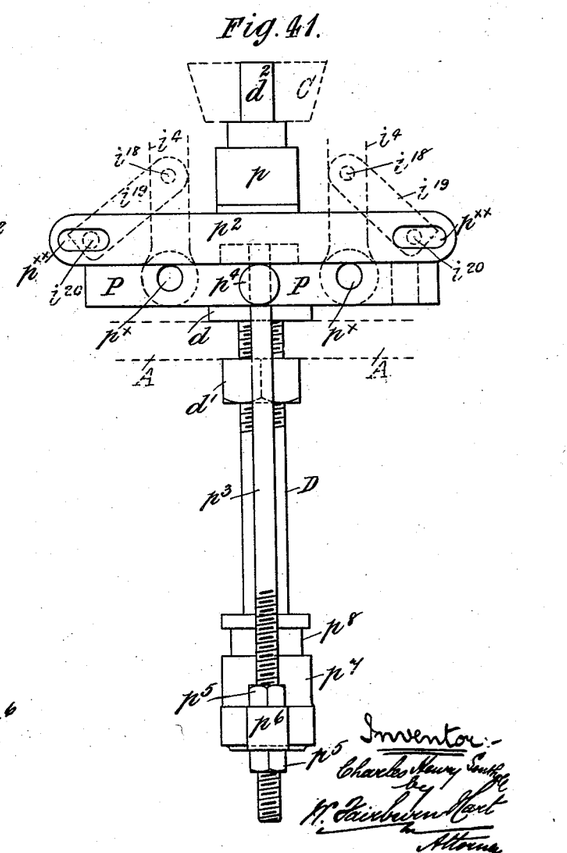
Figs. 41, 42, and 43 are respectively a side and end elevation, and a plan looking at the top of mechanism through which motion is given to the heel tool.
Figure 42:
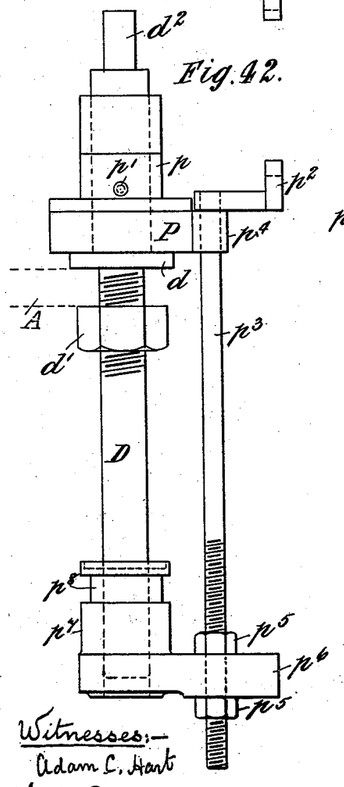

The table A, the pillars $a$ $a'$ and bridge $a^2$ constitute the framework of the machine. The table A is usually mounted upon legs or standards not shown in the drawings. On the table is mounted and fixed the sole rest or stand B (Figs. 7 and 8) which consists of a piece B shaped to the contour of the sole, and made to project beyond the stand or upright $b$ to which it is cast or otherwise fixed. In the sole piece are provided any desired number of recesses $b'$ for receiving the movable sole supporting piece B' (Figs. 9, 10 and 11), and on its free end $b^2$ is mounted the heel block C (Figs. 12 and 13). The free end $b^2$ is supported by the rod D (Figs. 41 to 43) to be hereinafter described, and which is secured to the table A by means of the collar $d$ and nut $d'$. The end $d^2$ is reduced in diameter to form a shoulder on which the end $b^2$ of piece B rests. The reduced end $d^2$ passes through a hole $c$ in the heel block C as well as through the piece B, and the heel block is retained in position by a pin $b^3$ fixed to the piece B and which passes into a hole $c'$ provided for its reception in the block C.

The movable sole supporting piece B′ consists of a curved plate, the radius of which is struck from the center of shaft $j$ to be hereinafter described. The plate B′ is fixed to a casting B² provided with a pin B³ which is placed in one of the holes $b'$. The movable sole supporting piece may be moved backward and forward on the sole rest B according to the size of the boot or shoe to be operated upon, and held in position by means of the pin B³.

Figure 5:
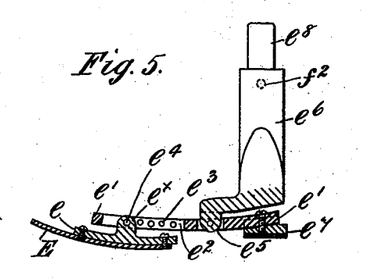
Figs. 5 and 6 are respectively a part sectional elevation and a plan looking at the top of the adjustable last or block.
Figure 6:
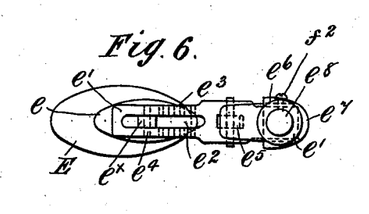

Above the movable sole supporting piece B′ is mounted the adjustable last or block E (Figs. 5 and 6) constructed as follows:—The last or bedding piece E is curved to correspond with the radius of the sole supporting piece B′ and it is fixed to the carrying piece $e$ which is jointed by the lug $e^x$ to the slotted swinging lever $e'$. The lug $e^x$ of the carrying piece is placed in the slot $e^2$ of the swinging lever, and its position therein may be regulated according to the size of the boot or shoe by means of the holes $e^3$ and pin $e^4$. The lever $e'$ is jointed by the lug $e^5$ provided for its reception on the projecting toe of the spindle $e^6$. To the rear end of the swinging lever $e'$ is fixed the heel bedding piece $e^7$. It will be noticed on reference to the drawings that the lug $e^5$ which forms the fulcrum for the lever $e'$ is placed between the heel bedding piece $e^7$ and the lug $e^x$ whereby the pressure may be evenly distributed between the sole and heel bedding pieces. The end $e^8$ of the spindle $e^6$ is reduced in diameter to form a shank which is passed into the recess $f$ formed in the end of the sleeve F (Fig. 2) which slides in the boss $a^4$ cast on the bridge $a^2$. The spindle $e^6$ is retained in position in the sleeve F by means of the catch $f'$ and screw $f^2$. The sleeve F is raised and lowered, carrying with it the last E, by means of the hand wheel $f^3$ and screw $f^4$ which is supported by the bearing $a^5$, and which works in the nut $f^5$ formed in the upper end of sleeve F.

Arranged around the sole supporting piece B′ and last E are the fore part burnishing tools or setters, hereinafter termed tools, G G, the waist burnishing tools H H, and heel burnishers I I which are respectively constructed and actuated as hereinafter described. Two sets of forepart, waist, and heel burnishing tools are provided and mounted respectively, one set of each, on each side of the last E.

Figure 19:
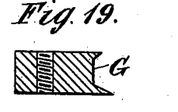
Figs. 19 and 20 are a section and a plan of forepart burnishing tool.
Figure 20:
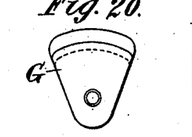
Figure 44:
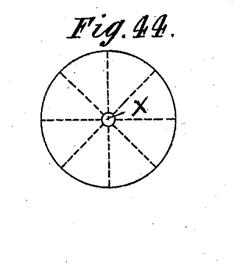
Fig. 44 is a diagram showing the method of producing the forepart burnishing tools.

The forepart burnishing tools G G are formed out of a circular disk (Fig. 44) turned on its periphery to suit the contour of the edge to be set on burnished. The periphery of the disk may be shaped as shown, for example, at Fig. 19; the hole $x$ in the center of the disk being for mounting it upon a mandrel for turning the periphery to shape in a lathe. The disk after being turned to shape is divided into sections, as shown by dotted lines at Fig. 44, to form tools of the shape shown at Fig. 20. By first turning the periphery of the disk to shape, and then dividing it into sections as described I insure that each tool or set of tools shall be exactly alike and work accurately.

Figure 1:
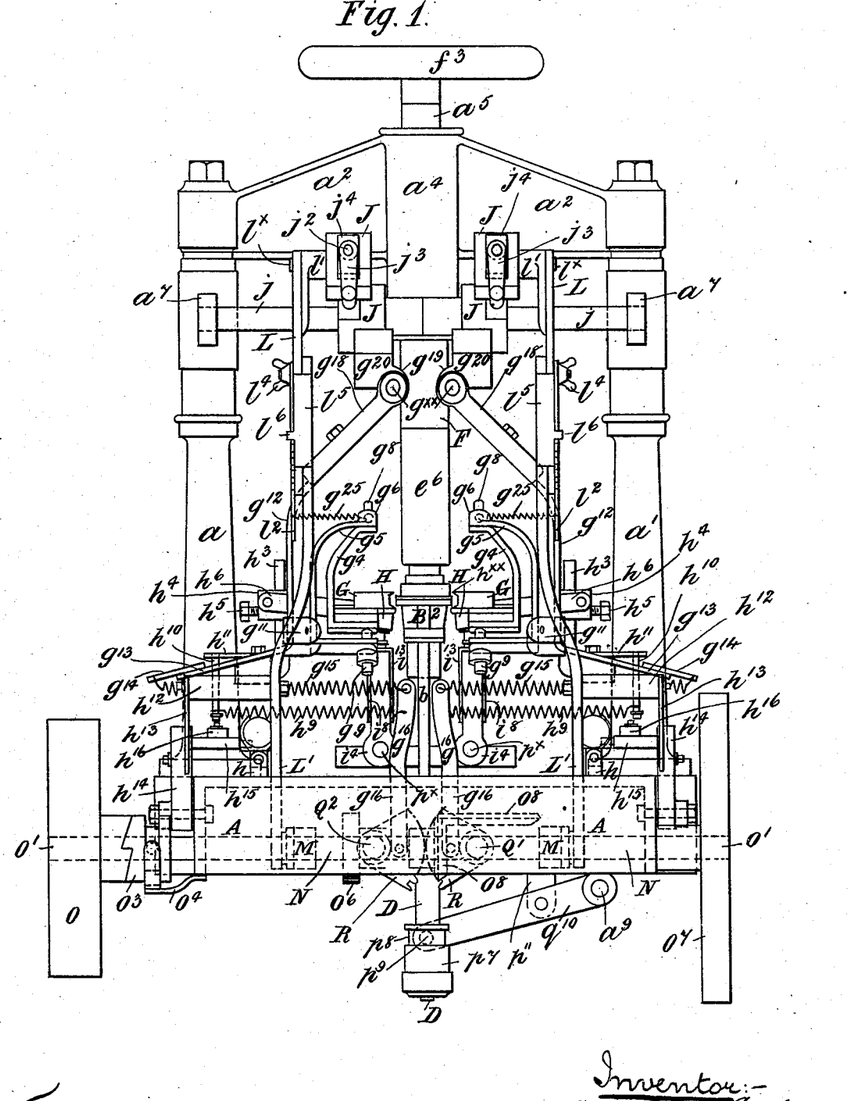
Figure 1 is a front elevation of machine with stand removed.
Figure 3:
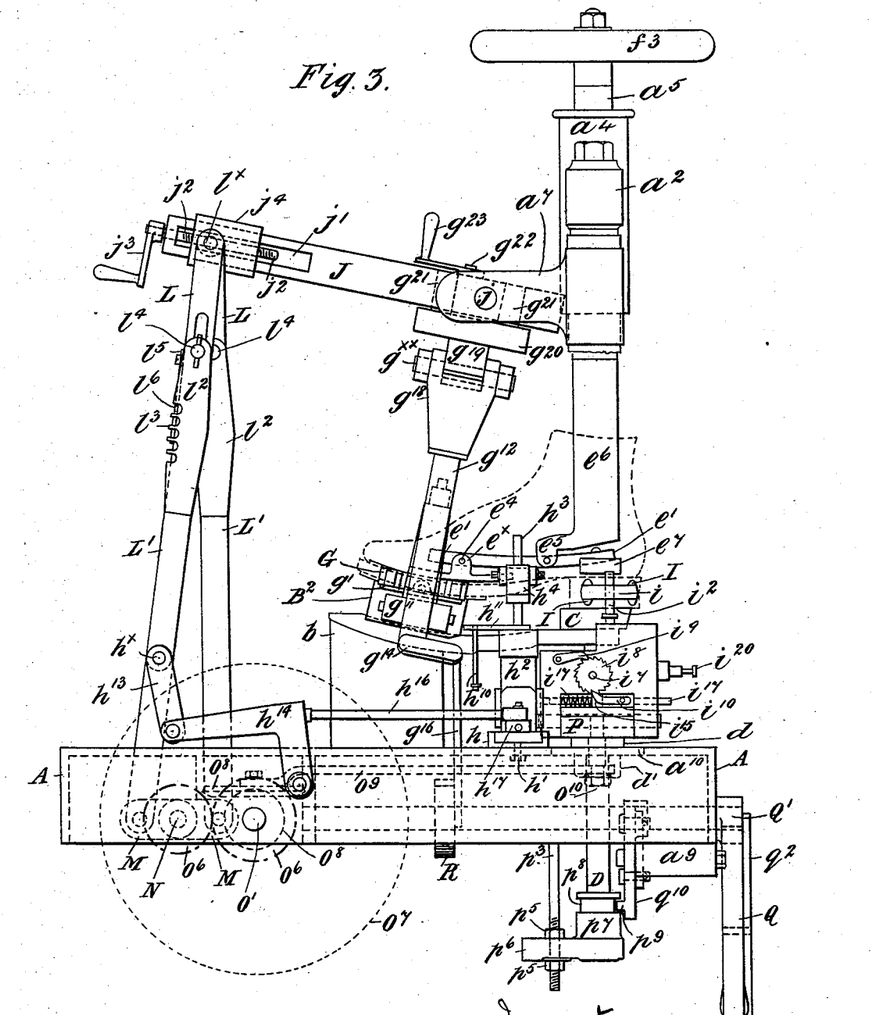
Fig. 3, a side elevation with one of the supporting pillars removed.
Figure 14:
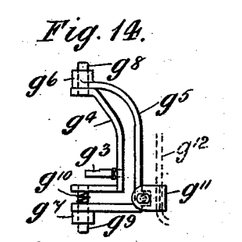
Figure 15:
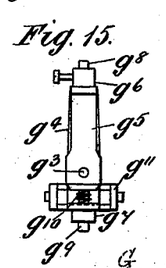
Figure 17:
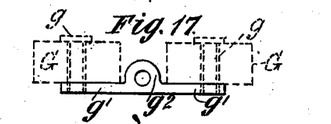
Figs. 17 and 18 are respectively an end elevation and a plan of forepart tool holder.
Figure 18:
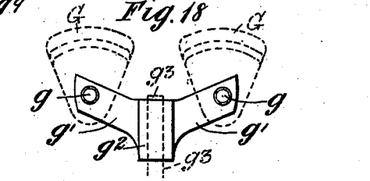
Figures 21, 23:
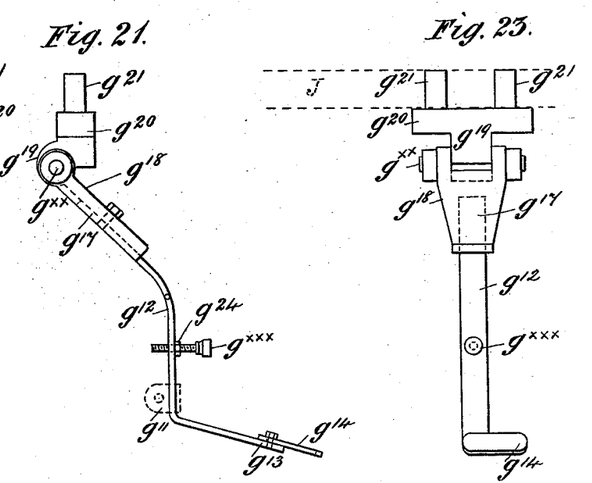
Figs. 21, 22, 23, and 24 are respectively side, front, and back elevations, and a plan of lever for supporting the forepart tool carrier.
Figure 22:
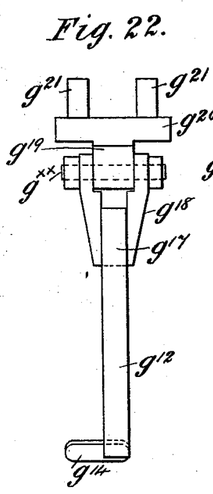
Figure 24:
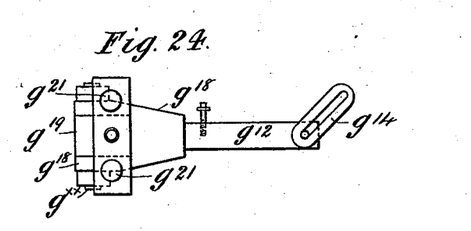

Each of the tools G G is mounted upon a pin or stud $g$ fixed to the holder $g'$ (Figs. 17 and 18) which is mounted by a boss $g^2$ on the pin $g^3$ fixed to the bracket $g^4$ of carrier $g^5$ (Figs. 14, 15, and 16). The bracket $g^4$ is mounted, by the pins $g^8$ $g^9$, vertically in axial bearings $g^6$ $g^7$ provided on the carriage $g^5$ whereby a horizontal rocking motion is provided for the tools G G. The top of the bracket $g^4$ is retained against the under side of the bearing $g^6$ by means of a helical spring $g^{10}$ arranged to encircle the pin $g^9$ between the under side of bracket $g^4$ and top of bearing $g^7$. The carrier $g^5$ is jointed by a bracket $g^{11}$ to the supporting lever $g^{12}$ to which a radial reciprocating motion is imparted as hereinafter described. The supporting lever $g^{12}$ is bent as shown at Fig. 21 for the purposes to be described. To the lower end $g^{13}$ of the lever $g^{12}$ is fixed, by a set screw, a slotted plate $g^{14}$ to which a spiral spring $g^{15}$ (Fig. 1) is attached. The other end of spring $g^{15}$ is attached to a lever $g^{16}$ fixed to the sector R. The upper end $g^{17}$ of supporting lever $g^{12}$ is fixed to the bifurcated fixing $g^{18}$ which is attached by a pin $g^{xx}$ to the lug $g^{19}$ of fixing $g^{20}$ so as to form a hinge or joint. On the top of the fixing $g^{20}$ are cast or otherwise fixed two pins or projections $g^{21}$ which fit into holes or recesses provided for their reception in the rear and enlarged end of one of the rocking levers J J. The fixings $g^{20}$ and levers $g^{12}$ are adjustably retained in connection with the rocking levers J J by means of screws $g^{22}$ armed with handles $g^{23}$ (Fig. 3.) Two tools G G constitute a set, and they are mounted in supporting mechanism as described, one set on each side of the fore part of the boot or shoe as shown at Fig. 1. Each set of tools may be separately and independently raised or lowered to its work by means of its adjusting screw $g^{22}$ actuated by handle $g^{23}$.

By mounting the tools G G as described on the brackets $g^4$ and carriers $g^5$ and by jointing the latter to hinged levers $g^{12}$—with springs $g^{25}$ between top of the carriers $g^5$ and levers $g^{12}$—so as to be capable of adjustment in various ways it will be readily seen that not only will the springs $g^{10}$ allow the tools to adjust themselves to the longitudinal curvature of the sole; but the tools are also enabled to turn on pins $g^3$ and the brackets $g^4$ on pins $g^8$ $g^9$ for adjusting themselves accurately to the varying curves of the sole, and they are retained in contact therewith by the springs $g^{15}$. The tools G G may also be further adjusted to the edge of the sole by the set screws $g^{\times\times\times}$ armed with a lock nut $g^{24}$; the ends of the said screws being retained in contact with the carriers $g^5$ by springs $g^{25}$.

Figure 4:
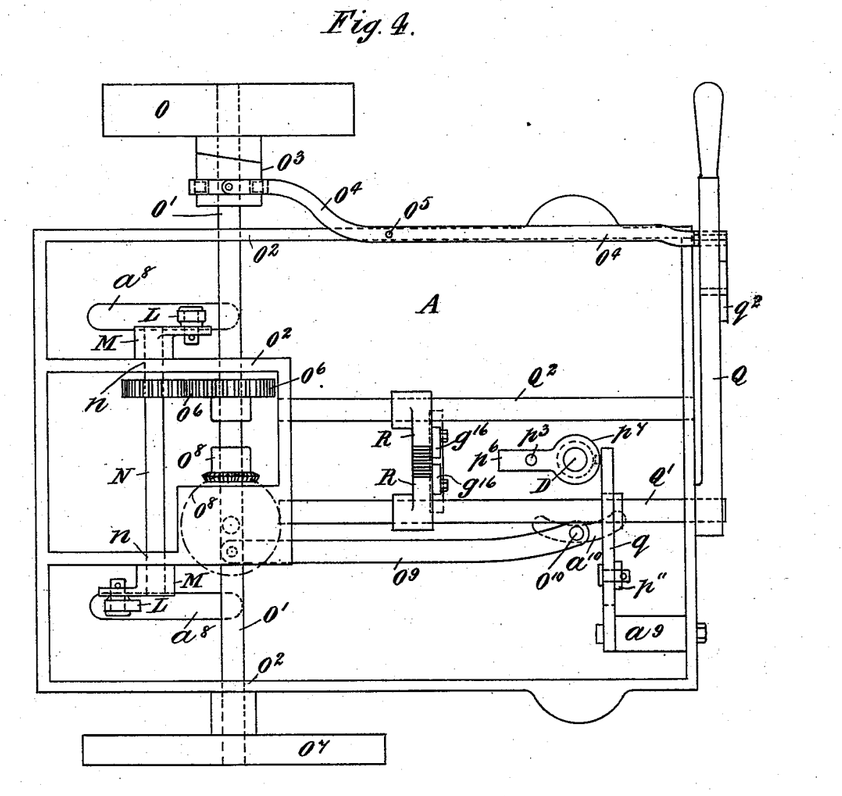
Fig. 4, a plan looking at the under side of the table showing the driving gear of the machine.
Figures 25, 26:
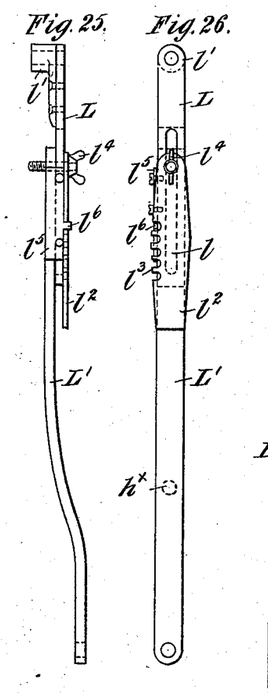
Figs. 25 and 26 are elevations of adjustable connecting rods.
Figure 27:
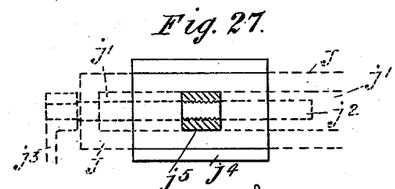
Figs. 27 and 28 are a section and elevation of sliding block to which one end of the connecting rods is attached.
Figure 28:
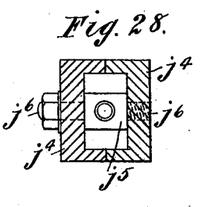

The rocking levers J J are mounted on the rocking shaft $j$, carried in bearing $a^7$ cast or otherwise attached to the pillars $a$ $a'$. In the levers J J are cast or formed slots $j'$ $j'$ in which are mounted the screws $j^2$, armed with handles $j^3$ for adjusting the sliding blocks $j^4$ $j^4$. The sliding blocks $j^4$ $j^4$ (Figs. 27 and 28) are each made in two portions arranged to fit (clamplike) and slide freely upon the surface of the ends of the levers J J. The two parts of each slide block $j^4$ are retained together by a nut $j^5$ provided with projecting studs $j^6$ $j^6$. The nut $j^5$ is arranged to work in the slot $j'$ and receives the end of screw $j^2$ as shown. To the sliding blocks $j^4$ are jointed at $l^\times$ the adjustable connecting rods L L (Figs. 25 and 26) through which a reciprocating motion is transmitted to the levers J J from cranks M M (Fig. 4) mounted on the shaft N carried in bearings $n$ $n$ on the under side of the table A. Slot holes $a^8$ $a^8$ are provided in the table A through which the connecting rods' ends L' L' pass. A rotary motion is conveyed to the shaft N from driving pulley O loosely mounted on shaft O' carried in bearings $O^2$ $O^2$ $O^2$ on under side of table A, whenever the clutch $O^3$ operated by lever $O^4$ pivoted at $O^5$ to the under side of table, is meshed and from shaft O' to shaft N through spur gearing $O^6$. On the opposite end of shaft O', to that on which the pulley O is mounted is fixed the fly wheel $O^7$.

The connecting rods L L (Figs. 25 and 26) are each made in two portions, an upper portion L and a lower portion L'. The upper and shorter portion L of each connecting rod is slotted at $l$ and its upper end is provided with a boss $l'$ by which it is attached to the sliding block $j^4$. The lower portion L' is curved as shown. On the face of the portion L is a gage plate $l^2$ provided with notches $l^3$, and if desired marked with numerals or other devices representing the sizes of the boots and shoes. The gage plate $l^2$ is mounted on a winged screw $l^4$ arranged to work in the upper end of the lower portion L'. To the edge of the upper portion L is fixed a plate $l^5$ provided with a projection $l^6$ which engages with one of the notches $l^3$. When it is desired to adjust the stroke of the levers J, J, say for instance for a size 8's, men's, the projection $l^6$ would be placed in the notch marked 8, and the two portions of the connecting rods securely clamped together by the winged screw $l^4$. In addition to this adjustment the stroke of the tools G G may also be increased or diminished, so as to overlap each other, by means of screws $j^2$, actuated by handles $j^3$, whereby the sliding blocks $j^4$ may be drawn farther from or moved nearer to the shaft $j$.

Figures 29, 30, 31:
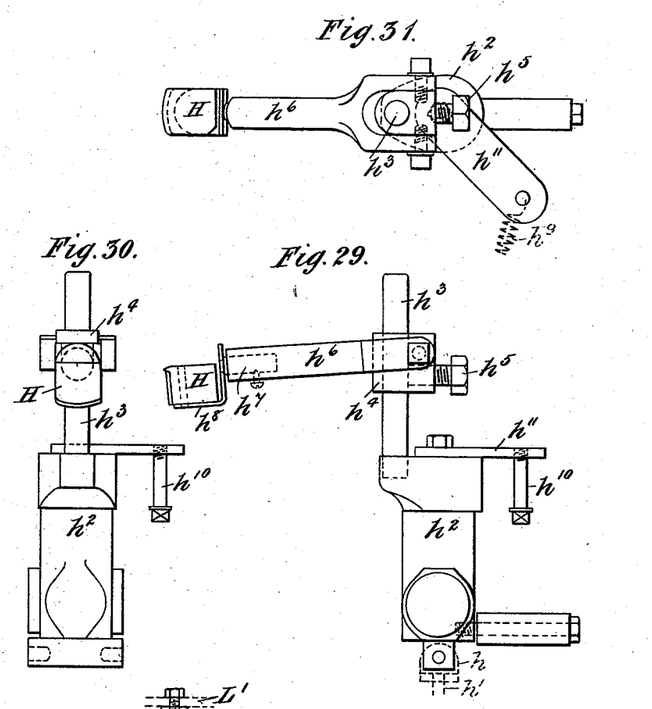
Figs. 29, 30, and 31 are respectively a side elevation, an end elevation, and a plan looking at the top of the waist burnishing tool and its supporting mechanism.

The waist tools H H are mounted on the table A respectively on each side of the last and shaped as shown at Figs. 29 to 31. Each waist tool H is mounted in mechanism capable of receiving what is known as a "universal motion" for adapting it to the varying curvatures of the waist portion of the sole.

The waist tool supporting mechanism I prefer to construct as follows, namely: To the table A is mounted a bifurcated bracket $h$ so as to turn freely on the pin $h'$ by which it is attached to the table. Between the bifurcations is mounted or jointed, so as to rock to and from the last, the upright $h^2$ armed on its top with the projecting pin $h^3$. On the pin $h^3$ is an adjustable collar $h^4$ retained in position by a set screw $h^5$. To the adjustable collar $h^4$ is jointed a bifurcated lever $h^6$ in which is bored a hole to form an axial bearing for the spindle $h^7$ of the L shaped tool carrier $h^8$. By arranging the spindle $h^7$ at a right angle to the carrier $h^8$ and mounting it in the axial bearing I thereby complete the universal joint of the supporting mechanism which permits the waist tools to adapt themselves to the varying curvatures of this portion of the sole. The top ledges $h^{\times\times}$ of the waist tools H H are arranged to ride upon the upper surface of the sole, and tools H and levers $h^6$ are kept to their work by means of springs $h^9$ $h^9$ attached at one of their ends to the levers $g^{16}$ hereinbefore mentioned, while their opposite ends are attached to pins $h^{10}$ projecting from plates $h^{11}$ fixed to the tops of the uprights $h^2$.

Figure 32:
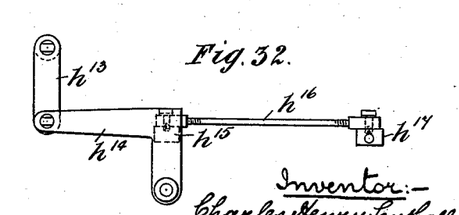
Figure 33:
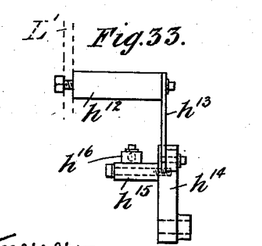
Figures 35, 39, 40:
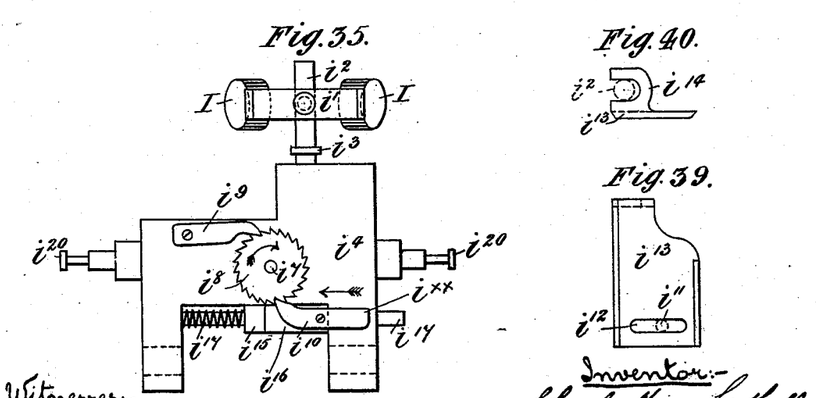
Figs. 35, 36, 37 and 38 are respectively a front and back elevation, a transverse section, and a plan looking at the top of the heel burnishing tool and its supporting mechanism.
Figs. 39 and 40 are an elevation and plan of a detail for raising and lowering the heel burnishing tool.
Figure 36:
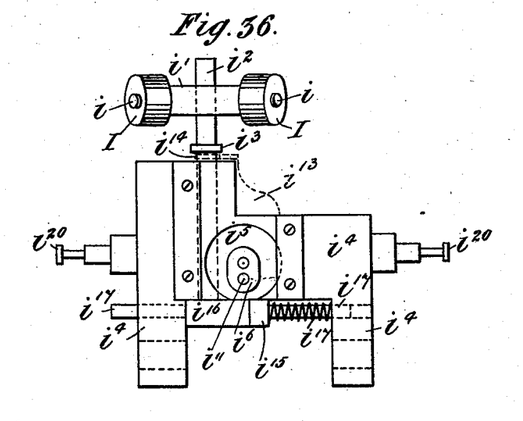
Figure 37:
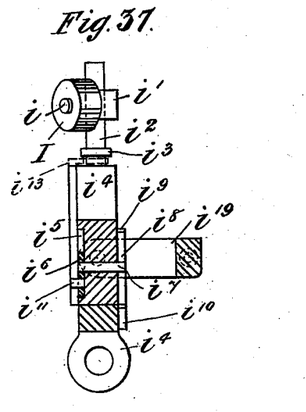

The required reciprocating motion is transmitted to the waist tools from the connecting rods L' L' through pins $h^{12}$ fixed to connecting rods (Figs. 32 to 34) at $h^\times$, links $h^{13}$, L shaped levers $h^{14}$ pivoted to the side of the table A, swivel blocks $h^{15}$ fixed to levers $h^{14}$, adjustable connecting rods $h^{16}$, and swivel blocks $h^{17}$ fixed by pins to the uprights $h^2$.

The heel burnishers I I are shaped as shown at Figs. 35 to 38, and they are mounted upon pins $i$ $i$ fixed to the carriers $i'$ $i'$. The carriers $i'$ $i'$ are adjustably mounted upon the vertically sliding pins $i^2$ $i^2$ provided with collars $i^3$ $i^3$. The pins $i^2$ $i^2$ are arranged to work in holes provided for their reception in the brackets $i^4$ $i^4$, which are jointed at $p^\times$ to the rocking platform P to be hereinafter described. In each of the brackets $i^4$ is cut or formed a recess $i^5$ in which a crank $i^6$ rotates. The crank $i^6$ is mounted on a shaft $i^7$ carried in bearings provided on the said bracket. On the opposite end of the shaft $i^7$ is a ratchet wheel $i^8$ in the teeth of which two pawls $i^9$ $i^{10}$ are made to engage. On the crank $i^6$ is a pin $i^{11}$ which works in a slot hole $i^{12}$ (Fig. 39) of a slide $i^{13}$ arranged to work on the front of the bracket $i^4$. The slide $i^{13}$ is provided with a bifurcated projection $i^{14}$ (Fig. 40) arranged to pass under the collar $i^3$. The slide $i^{13}$ is employed for raising and lowering the heel burnishing tools I I when in operation. The raising and lowering of the slide $i^{13}$ are controlled by the crank $i^6$ to which an intermittent rotary motion is imparted from the boss $p$ of the rocking platform P by means of the pins or tappets $p'$ $p'$ as hereinafter described.

The platform P (Figs. 41 to 43) is mounted upon the collar $d$ of the rod D and its boss $p$ is armed with two projecting pins or tappets $p'$ $p'$ which engage with the projections $i^{15}$—one of which is shown at Figs. 35 to 38—of the horizontal sliding pieces $i^{16}$. Each of the sliding pieces $i^{16}$ is provided with two spindles $i^{17}$, one at each end of the sliding piece, which work in bearings in the bracket $i^4$. To the face of the sliding piece $i^{16}$ is fixed the pawl $i^{10}$, provided with a weighted end $i^{xx}$ for retaining it in gear with the ratchet wheel. The pawl $i^9$ is jointed to the face of the bracket $i^4$. Whenever the sliding piece $i^{16}$ is moved, in the direction of arrow, by the tappet $p'$ coming in contact with the projection $i^{15}$ the ratchet wheel $i^8$ will be actuated and motion conveyed through shaft $i^7$ to crank $i^6$ and pin $i^{11}$ for raising or lowering,—according to the position of the crank pin in its path of rotation,—the slide $i^{13}$, pins $i^2$ and tools I I. A spring $i^{17}$ is employed for returning the sliding piece $i^{16}$ to its normal position. The pawl $i^9$ is employed for retaining the slide $i^{13}$ in a stationary position until the ratchet wheel is again acted upon by pawl $i^{10}$. To each of the brackets $i^4$ is jointed at $i^{18}$ a bifurcated lever $i^{19}$ armed with pins or trunnions $i^{20}$ which engage with a slotted lever $p^2$ (Fig. 41) fixed to a rod $p^3$ arranged to slide in the bearing $p^4$. To the opposite end of rod $p^3$ is attached by means of lock nuts $p^5$ the short lever $p^6$ which is cast or otherwise fixed to the boss $p^7$ arranged to slide upon the rod D. In the boss $p^7$ is cut or formed a groove or recess $p^8$ in which works a pin $p^9$ fixed to a lever $q^{10}$ (Figs. 1 and 2) pivoted at $a^9$ to the under side of the table A, and connected by a link $p^{11}$ to a lever $q$ mounted on shaft $Q'$ to be hereinafter described.

Figure 43:
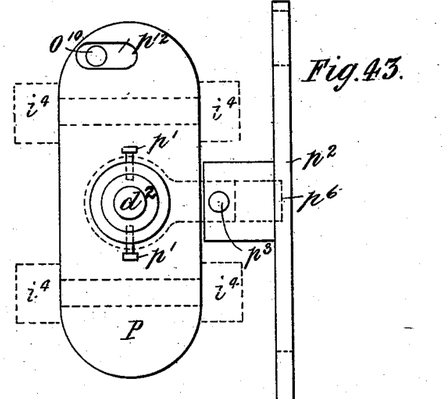

The required reciprocating motion is imparted to the platform P from the driving shaft $O'$ (Fig. 3) through bevel gearing $O^8$, connecting rod $O^9$ pin $O^{10}$ which passes through the slot hole $a^{10}$ in the table A, and works in the slot hole $p^{12}$ of the platform P as shown at Fig. 43.

The starting lever Q is provided with the slot $q'$, a portion of which is concentric with the axis of shaft $Q'$, but the upper end is made to recede inward to form a cam for actuating lever $O^4$, which is in gear therewith, for throwing the clutch $O^3$ in and out of gear with the driving pulley O. On the face of the starting lever Q is pivoted a second lever $q^2$ provided with the recesses $q^3$ $q^4$ for respectively retaining the lever Q in its highest or lowest position. Pins $q^6$ may be employed for preventing the lever $q^2$ falling from its work. The lever Q is provided with a handle $q^7$ whereby it may be raised or lowered. The starting lever Q is mounted upon shaft $Q'$. When the handle end of lever Q is lowered, to the position shown at Fig. 2, the lever $O^4$ will have moved the clutch $O^3$ into gear with driving pulley O, and the recessed end $q^4$ of lever $q^2$ will have passed under the outer end of lever $O^4$ which works in the slot $q'$.

Figure 2:
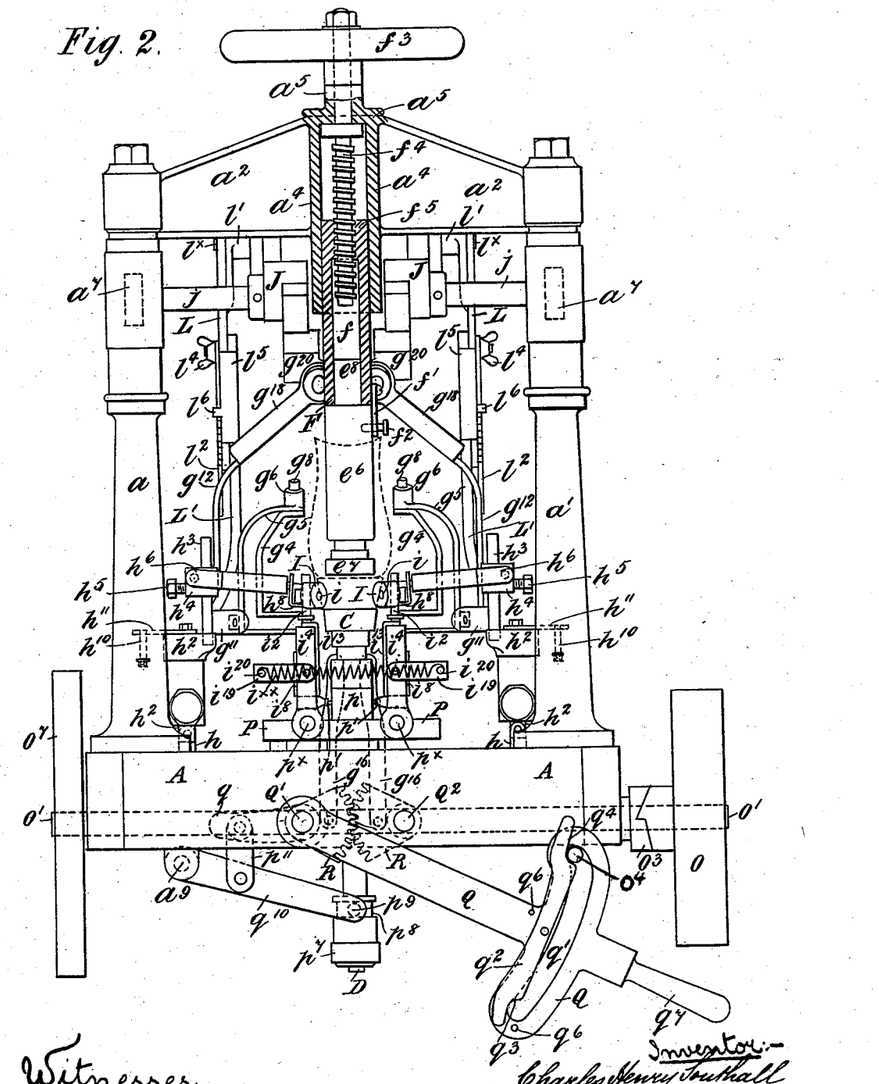
Fig. 2, a part back elevation and section of machine with stand removed.
Figure 38:
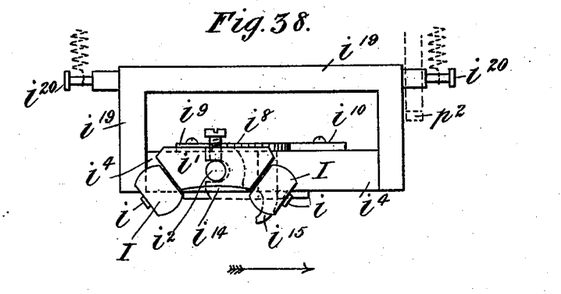

For bringing all the burnishing tools G G, H H, I I, in or out of contact with the edges of the sole, waist, and heel simultaneously two longitudinal shafts $Q'$ $Q^2$ are mounted in bearings under the table A and are geared together by the sectors R R to which the upright levers $g^{16}$ are fixed. On the outer end of shaft $Q'$ the lever Q is mounted, and when it is depressed the shafts $Q'$ $Q^2$, by being geared together, are simultaneously rotated causing the two levers $g^{16}$ to move toward each other whereby the levers $g^{12}$ and $h^2$ are, by being jointed, drawn toward the last E and by means of the springs $g^{15}$ and $h^9$ the tools G G and H H are closed to their work. At the same time motion is conveyed, by the raising of the lever $q$, mounted upon shaft $Q'$, through link $p^{11}$ to lever $q^{10}$ which is then raised, and by means of pin $p^9$ working in groove $p^8$ causes the boss $p^7$ to slide upon the rod D carrying with it the lever $p^6$ and rod $p^3$ for raising the slotted lever $p^2$. When the lever $p^2$ is raised the trunnions $i^{20}$ are caused to move outward in the slots $p^{xx}$ for raising the bifurcated levers $i^{19}$ and brackets $i^4$ to the position shown in the drawings at Figs. 2 and 37 thereby closing the heel tools I I upon their work. The brackets $i^4$ $i^4$ and bifurcated levers $i^{19}$ are retained in contact with their work by means of springs $i^{xx}$ fixed to the trunnions $i^{20}$ as shown at Figs. 2 and 38. Simultaneously with the depression of the lever Q and closing of the tools G G, H H, and I I the clutch $O^3$ is thrown by lever $O^4$ into gear with driving pulley O.

When the lever Q is raised the action of the parts named are reversed, the burnishing tools withdrawn from contact with the edges of the sole, waist, and heel, and the clutch $O^3$ thrown out of gear with the driving pulley O.

The action of the machine is as follows: The boot or shoe, shown in dotted lines at Fig. 3 is placed upon the last,—the edges of the sole, waist, and heel having been previously colored or coated with ink or heel ball,—and the front portion of the bedding plate E forced well up to the toe. The sole rest $B'$ having been adjusted to the required position upon the stand B, the end $e^8$ of the spindle $e^6$ to which the swinging lever $e'$,—carrying the bedding plate E and piece $e^7$,—is jointed is then placed within the recess $f$ of the sleeve F and held in position by catch $f'$ and thumbscrew $f^2$. The hand wheel $f^3$ is then rotated until the plate E and heel bedding piece $e^7$ are pressed by screw $f^4$ tightly down upon the inner surface of the sole, thereby clamping the boot, or shoe, tightly upon the sole rest $B'$ and heel block C. The connecting rods L L are then adjusted by the means previously described to suit the size of the boot or shoe to be operated upon. The position of the centers $l^x$ of said connecting rod are regulated by the screws $j^2$ so that the stroke of the forepart burnishing tools G G will overlap each other, and their distance from the center of shaft $j$ adjusted—in a vertical direction—by the screws $g^{22}$. The lever Q is then depressed for bringing, as already described, the three sets of burnishing tools G G, H H, and I I simultaneously into contact with the respective edges to be burnished and at the same time moving the clutch $O^3$ into gear with the driving pulley O, which causes the shafts $O'$ and N and gearing $O^6$ $O^8$ to revolve from which motion is transmitted, as described, to the various moving parts of the machine. When the edges of the boot or shoe sole and heel have been sufficiently burnished the handle end of lever Q is raised, the clutch $O^3$ withdrawn from gear with the driving pulley O, the action of the moving parts stopped, and the burnishing tools withdrawn from contact with the edges of the boot or shoe.

By the above described means the edges of the forepart, waist, and heel may be simultaneously and quickly burnished; and a motion is imparted to the burnishing tools similar to that when hand tools are employed.

Having now particularly described and ascertained the nature of the said invention, what I desire to secure by Letters Patent is—

1. In a boot and shoe burnishing machine, an adjustable last pivoted to a slotted swinging lever carrying the heel bedding piece, said lever being jointed to a spindle interposed between the adjustable last and a sliding sleeve mounted in the framework of the machine, said sleeve being operated by a screw armed with a hand wheel, as set forth.

2. In a boot and shoe burnishing machine, the combination of table A, its pillars $a$ $a'$ on either side, and bridge $a^2$ mounted on said pillars and across the table, an adjustable last E working between said pillars and jointed as described to a supporting piece $e^6$, a sliding sleeve F working in a boss $a^4$, a catch $f'$, screws $f^2$ and $f^4$, hand wheel $f^5$, these four latter parts being adjacent to $e^6$ and $a^4$, a sole rest B mounted on the table of the machine, adjustable sole supporting piece $B'$ and heel block C mounted on said sole rest, and rod D fixed to the table, as set forth.

3. In a boot and shoe burnishing machine, the combination of forepart burnishing tools G G mounted horizontally over the table of the machine upon vertical pins $g$ $g$ fixed to a holder $g'$ parallel with the tools, a pin $g^3$ fixed at a right angle to a bracket $g^4$ for supporting said holder $g'$, a bracket $g^4$ mounted vertically in axial bearings of a carrier $g^5$ working at a right angle to said tools, a bracket $g^{11}$ for jointing said carrier to a supporting lever $g^{12}$ parallel to said carrier, a bifurcated fixing $g^{18}$ connected to said supporting lever above the carrier $g^5$, an adjustable block $g^{20}$ armed with pins $g^{21}$ for attaching it to a rocking lever J, an adjusting screw $g^{22}$ mounted vertically in said rocking lever, a rocking lever J fixed to a shaft $j$ carried in bearings across the machine table, said bearings being fixed to pillars $a$ $a'$ fixed to the said table, as and for the purposes set forth.

4. In a boot and shoe burnishing machine, the combination of the forepart burnishing tools G G mounted horizontally over the table of the machine by supporting mechanism as described, adjusting screws $g^{\times\times\times}$ mounted in supporting levers $g^{12}$, slotted plates $g^{14}$ attached to the lower ends of the said supporting rods $g^{12}$, springs $g^{15}$ connected at one end to said plates and at the other end to levers $g^{16}$ jointed to sectors R R mounted on longitudinal shafts $Q'$ $Q^2$, said shafts being carried parallel to each other in bearings under the table of the machine, and the means described for imparting motion to the shafts, as set forth.

5. In a boot and shoe burnishing machine, the combination of the forepart burnishing tools G G and their supporting mechanism as described, means described for imparting the requisite motion to the said tools consisting of connecting rods L $L'$ formed in two parts and held together by winged screw $l^4$, gage plate $l^5$ fixed to the upper portion of said connecting rods, said gage plates being armed with projections for engaging with notches formed in the lower portions of said connecting rods, cranks M attached to the lower ends of the connecting rods and mounted on intermediate shaft N, gearing $O^6$ for communicating motion from the driving shaft of the machine to said intermediate shaft, pins $l$ fixed to the sides of sliding blocks $j^4$ for the reception of the upper ends of said connecting rods, said sliding blocks being mounted in the ends of rocking arms J fixed to transverse shaft $j$, and screws $j^2$ armed with handles $j^3$ for adjusting the sliding blocks in a longitudinal direction as set forth.

6. The combination of tools G G formed out of a turned disk, tool supporting mechanism consisting of holders $g'$ fixed parallel with said tools, pins $g^3$ fixed at a right angle to brackets $g^4$, said brackets $g^4$ being mounted in axial bearings formed in carriers $g^5$ working at a right angle to said tools, brackets $g^{11}$ for jointing said carriers to supporting levers $g^{12}$, bifurcated fixings $g^{18}$ attached to said supporting levers above the carriers $g^5$, adjustable blocks $g^{20}$ armed with pins $g^{21}$ for attaching them to rocking levers J, adjusting screws $g^{22}$ mounted vertically in said rocking levers, rocking levers J mounted upon transverse shafts $j$ carried in bearings over the table of the machine, pillars $a$ $a'$ fixed to table A, sliding blocks $j^4$ formed in halves and bolted together by nuts $j^5$ and adjustably mounted in the ends of said rocking levers, screws $j^2$ armed with handles $j^3$ for adjusting said slide blocks in a longitudinal direction, connecting rods L $L'$ formed in two portions and held together by gage plates $l^5$ and winged screws $l^4$, the upper ends of said connecting rods being connected to said sliding blocks, and their lower ends to cranks M, said cranks being mounted on intermediate shaft N actuated by gearing $O^6$ from the driving shaft of the machine, as set forth.

7. In a boot and shoe burnishing machine, the combination of waist burnishing tools H fixed to carriers $h^8$ armed with pins $h^7$, said pins being mounted in the ends of bifurcated levers $h^6$ jointed to collars $h^4$, said collars being adjustably mounted upon pins $h^3$ fixed vertically in the ends of uprights $h^2$, said uprights being jointed to bifurcated brackets $h$ mounted axially upon the table of the machine, swivel blocks $h^{17}$ attached to uprights $h^2$, adjustable connecting rods $h^{16}$ arranged parallel with said table and attached to swivel blocks $h^{17}$ $h^{15}$, swivel blocks $h^{15}$ attached to bell crank levers $h^{14}$, said bell crank levers being pivoted by one arm to the table A and by the other arm to links $h^{13}$ jointed by pins $h^{12}$ to the adjustable connecting rods L as and for the purposes set forth.

8. The combination of bifurcated bracket $h$ mounted axially by pin $h'$ on table A, upright $h^2$ jointed to bracket $h$ and armed with a vertical pin $h^3$, adjustable collar $h^4$ sliding on said pin $h^3$, set screw $h^5$ mounted in said collar for retaining collar in position, bifurcated lever $h^6$ jointed to said collar $h^4$, carrier $h^8$ mounted axially by pin $h^7$ in the end of said bifurcated lever, waist tool H mounted upon said carrier, plate $h^{11}$ fixed to top of upright $h^2$ and armed with pendent pin $h^{10}$, spring $h^9$ attached to said pendent pin and to lever $g^{16}$, said lever being jointed to the sector R as set forth.

9. The combination of the waist tools H mounted upon supporting mechanism on the top of the table A as set forth, sectors R mounted upon shafts $Q'$ $Q^2$ carried in bearings under said table, levers $g^{16}$ pivoted to said sectors, springs $h^9$ interposed between said levers and tool supporting mechanism, swivel blocks $h^{17}$ attached to the uprights of the tool supporting mechanism, adjustable connecting rods $h^{16}$ arranged parallel with above said table and attached by their ends to swivel blocks $h^{17}$ $h^{15}$, swivel blocks $h^{15}$ attached to bell crank levers $h^{14}$ pivoted by one arm to said table and by the other arm to links $h^{13}$ connected by pins $h^{12}$ to adjustable connecting rods L, and the means herein described for imparting motion to said sectors R and said connecting rods L as set forth.

10. The combination of the heel burnishing tools I mounted upon pins $i$ fixed to carriers $i'$, said carriers being fixed to pins $i^2$ armed with collars $i^3$ and sliding in brackets $i^4$, slide pieces $i^{13}$ working on the face of said brackets and engaging by their bifurcated ends with said collars, cranks $i^6$ working in recesses of said brackets and engaging with the sliding pieces $i^{13}$, ratchet wheels mounted on crank shafts, pawls $i^9$ $i^{10}$ mounted on said brackets and sliding pieces $i^{16}$ armed with projections $i^{15}$ engaging with tappets $p'$ on boss $p$ of rocking platform P mounted above the table of the machine on a rod D fixed to said table, and the means described for closing the tools upon the work and imparting motion to the tools, as set forth.

11. The combination in a boot and shoe burnishing machine, of a rocking platform mounted upon a rod fixed to the table of the machine, a sleeve sliding upon said rod and armed with a short lever, a rod fixed at one end to said short lever, and armed at the other end with a slotted lever, bifurcated levers armed with trunnions engaging with the slotted levers, springs attached to said trunnions, bifurcated brackets carrying the heel burnishing tools and their raising and lowering mechanism, as set forth.

12. In a boot and shoe burnishing machine, the combination of the table and its pillars carrying the bridge, the work supporting and clamping mechanism, the burnishing tools arranged around the said work supporting mechanism and adapted to adjust themselves to the varying curvatures of the edges of the sole and heel and the mechanism described for simultaneously operating the said tools, as set forth.

In testimony whereof I have hereunto signed my name to this specification, in presence of two subscribing witnesses, this 28th day of July, 1893.

CHARLES H. SOUTHALL.

Witnesses:
W. FAIRBURN-HART,
ADAM C. HART.